(12) United States Patent
Brown (10) Patent No.: US 9,950,763 B2
(45) Date of Patent: Apr. 24, 2018

(54) BICYCLE HANDLEBAR ASSEMBLY WITH FOREARM SUPPORT

(71) Applicant: Bernard E. Brown, Westwood, KS (US)

(72) Inventor: Bernard E. Brown, Westwood, KS (US)

( * ) Notice: Subject to any disclaimer, the term of this patent is extended or adjusted under 35 U.S.C. 154(b) by 0 days.

(21) Appl. No.: 15/203,545

(22) Filed: Jul. 6, 2016

(65) Prior Publication Data

US 2017/0008598 A1 Jan. 12, 2017

Related U.S. Application Data

(60) Provisional application No. 62/188,915, filed on Jul. 6, 2015.

(51) Int. Cl.
*B62K 21/16* (2006.01)
*B62K 21/26* (2006.01)
*B62K 21/12* (2006.01)

(52) U.S. Cl.
CPC ............ *B62K 21/16* (2013.01); *B62K 21/125* (2013.01); *B62K 21/26* (2013.01)

(58) Field of Classification Search
CPC ....... B62K 21/12; B62K 21/125; B62K 21/16
See application file for complete search history.

(56) References Cited

U.S. PATENT DOCUMENTS

| | | | |
|---|---|---|---|
| 5,000,469 A * | 3/1991 | Smith | B62K 21/125 280/261 |
| 5,149,034 A | 9/1992 | Ganaja | |
| 5,197,350 A * | 3/1993 | Borromeo | B62K 21/125 403/205 |
| 5,201,243 A | 4/1993 | Schneider | |
| 5,509,328 A | 4/1996 | Lai | |
| 5,555,775 A | 9/1996 | D'Aluisio et al. | |
| 5,727,427 A | 3/1998 | Nien | |
| 5,737,967 A | 4/1998 | Hartley | |

(Continued)

FOREIGN PATENT DOCUMENTS

| | | |
|---|---|---|
| DE | 9411263 | 12/1994 |
| GB | 2304084 | 3/1997 |
| WO | 2015054987 | 4/2015 |

OTHER PUBLICATIONS

"International Search Report & Written Opinion; PCT/US2016/041165, Oct. 14, 2016".

*Primary Examiner* — Kevin Hurley
(74) *Attorney, Agent, or Firm* — Law Office of Mark Brown, LLC; Christopher M. DeBacker (57) ABSTRACT

A bicycle handlebar assembly including a stem extension and a handlebar cross member, a pair of steering bars affixed perpendicular to the handlebar cross member, and a pair of forearm supports affixed to the handlebar cross member in proximity with the steering bars. The gear shifting and brake controls are placed at the forward ends of the two steering bars. An embodiment of the invention would allow this handlebar assembly to be raised or lowered as the rider desires, to provide raised comfort position and a lowered aerodynamic position. The forearm supports and steering bars provide comfort and control to the rider not provided by typical handlebars. Alternatively the pair of steering bars could be replaced with a single closed steering bar circuit.

13 Claims, 12 Drawing Sheets

(56) References Cited

U.S. PATENT DOCUMENTS

| | | | |
|---|---|---|---|
| 6,050,585 A | 4/2000 | Rai | |
| 6,092,438 A | 7/2000 | Soto | |
| 6,098,493 A | 8/2000 | Cortes | |
| 6,564,673 B1 | 5/2003 | Kilmer | |
| 7,127,966 B2 | 10/2006 | Meng | |
| 7,213,485 B2 * | 5/2007 | Huang | B62K 21/125 74/551.1 |
| 7,698,967 B2 * | 4/2010 | Ording | B62K 21/12 74/551.1 |
| 7,837,212 B2 * | 11/2010 | D'Aluisio | B60T 7/10 280/279 |
| 8,029,011 B2 | 10/2011 | King et al. | |
| 8,172,247 B2 | 5/2012 | Weber et al. | |
| 8,230,758 B1 | 7/2012 | Eddy | |
| 8,590,418 B2 * | 11/2013 | Hon | B62K 21/16 74/551.3 |
| 8,661,935 B2 | 3/2014 | Cote et al. | |
| 8,955,862 B1 * | 2/2015 | Narrow | B62L 3/02 280/264 |
| 2003/0150292 A1 | 8/2003 | Duncan | |
| 2005/0109151 A1 | 5/2005 | Chiang et al. | |
| 2006/0230872 A1 | 10/2006 | Huang | |
| 2008/0036170 A1 | 2/2008 | Vroomen et al. | |
| 2008/0168857 A1 * | 7/2008 | Chiang | B62K 21/12 74/551.1 |
| 2011/0215549 A1 * | 9/2011 | Plainfield | B23P 11/00 280/270 |
| 2015/0145230 A1 * | 5/2015 | Poole | B62L 3/02 280/210 |
| 2015/0291247 A1 * | 10/2015 | Fukao | B62K 23/06 74/473.14 |
| 2016/0176468 A1 * | 6/2016 | Poole | B62K 21/12 280/263 |
| 2016/0221632 A1 * | 8/2016 | Fujiwara | B62L 3/023 |
| 2017/0050701 A1 * | 2/2017 | Feuerstein | B62M 25/08 |

* cited by examiner

BICYCLE HANDLEBAR ASSEMBLY WITH FOREARM SUPPORT

CROSS-REFERENCE TO RELATED APPLICATION

This application claims priority in U.S. Provisional Patent Application No. 62/188,915, filed Jul. 6, 2015 which is incorporated by reference herein.

BACKGROUND OF THE INVENTION

1. Field of the Invention

The present invention relates generally to a bicycle handlebar assembly, and more specifically to handlebar assembly including forearm supports for minimizing impact on a rider's hands and wrists while maintaining superior control and handling of the bicycle.

2. Description of the Related Art

Many people enjoy riding bicycles or other similar vehicles; however, some are not able to ride as often as they like due to wrist or hand injuries or sensitivity while riding. Since the operator of a typical bicycle must grip the handlebars in front of them, any impact against the front wheel of the bicycle will be transferred up the frame of the bicycle and will jolt the operator's hands and wrists. Often riders can suffer discomfort or pain in their wrists and hands while riding, and this discomfort can prevent the rider from riding.

Existing bicycles or attachments for bicycles include what are well known in the art as "aerobars." These aerobars allow the rider to lean forward on the bicycle, placing their forearms into supports and gripping narrowly-spaced handlebars for increased aerodynamic performance. However, in this position the rider loses a great deal of control over the bicycle due to their new orientation on the bike and the narrow spacing of the handles.

What is needed is a handlebar assembly with forearm rests that allow users to eliminate impacts on their hands and wrists, while maintaining the comfortable riding position enjoyed with typically-spaced handlebars.

Heretofore there has not been available a bicycle handlebar assembly with the advantages and features of the present invention.

BRIEF SUMMARY OF THE INVENTION

The present invention generally provides a bicycle handlebar assembly including a stem extension and a handlebar cross member, a pair of steering bars affixed perpendicular to the handlebar cross member, and a pair of forearm supports affixed to the handlebar cross member in proximity with the steering bars. The gear shifting and brake controls are placed at the forward ends of the two steering bars.

An alternative embodiment of the present invention includes an adjustable handlebar cross member assembly which may be raised and lowered along a mounting structure affixed to a stem extension. This allows a more experienced bicycle rider to lower the handlebars while the vehicle is in operation to obtain a more aerodynamic position. This design not only spreads the forearm supports, but it also raises the handlebar cross member, so the rider both sits up higher in a more traditional and comfortable way, and rides with arms more spread apart in a more traditional and comfortable way

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. First Embodiment Bicycle Handlebar System 2

Figure 1:
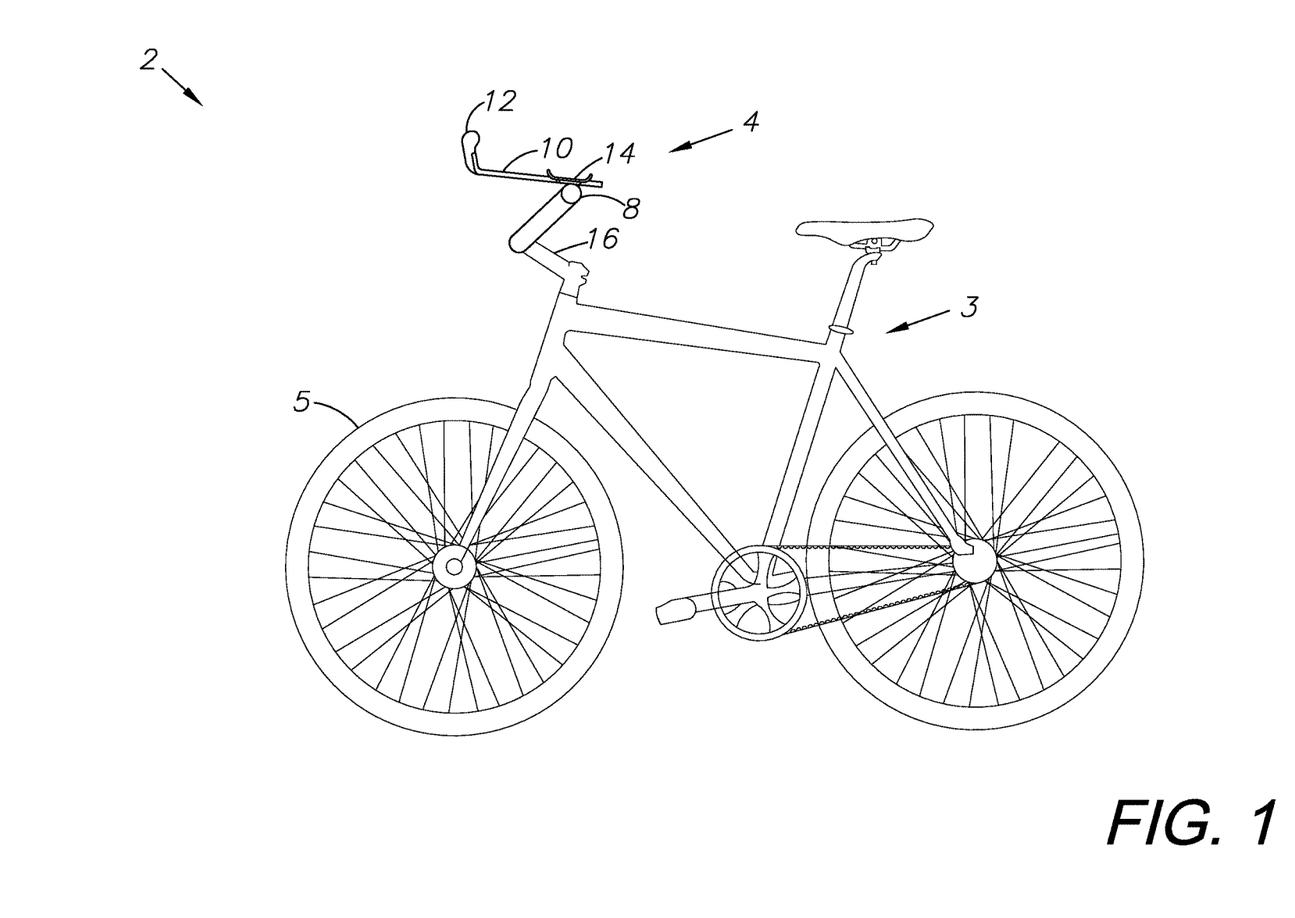
FIG. 1 is a side-elevational view of a first embodiment of the present invention shown in a typical environment of a bicycle.
Figure 2:
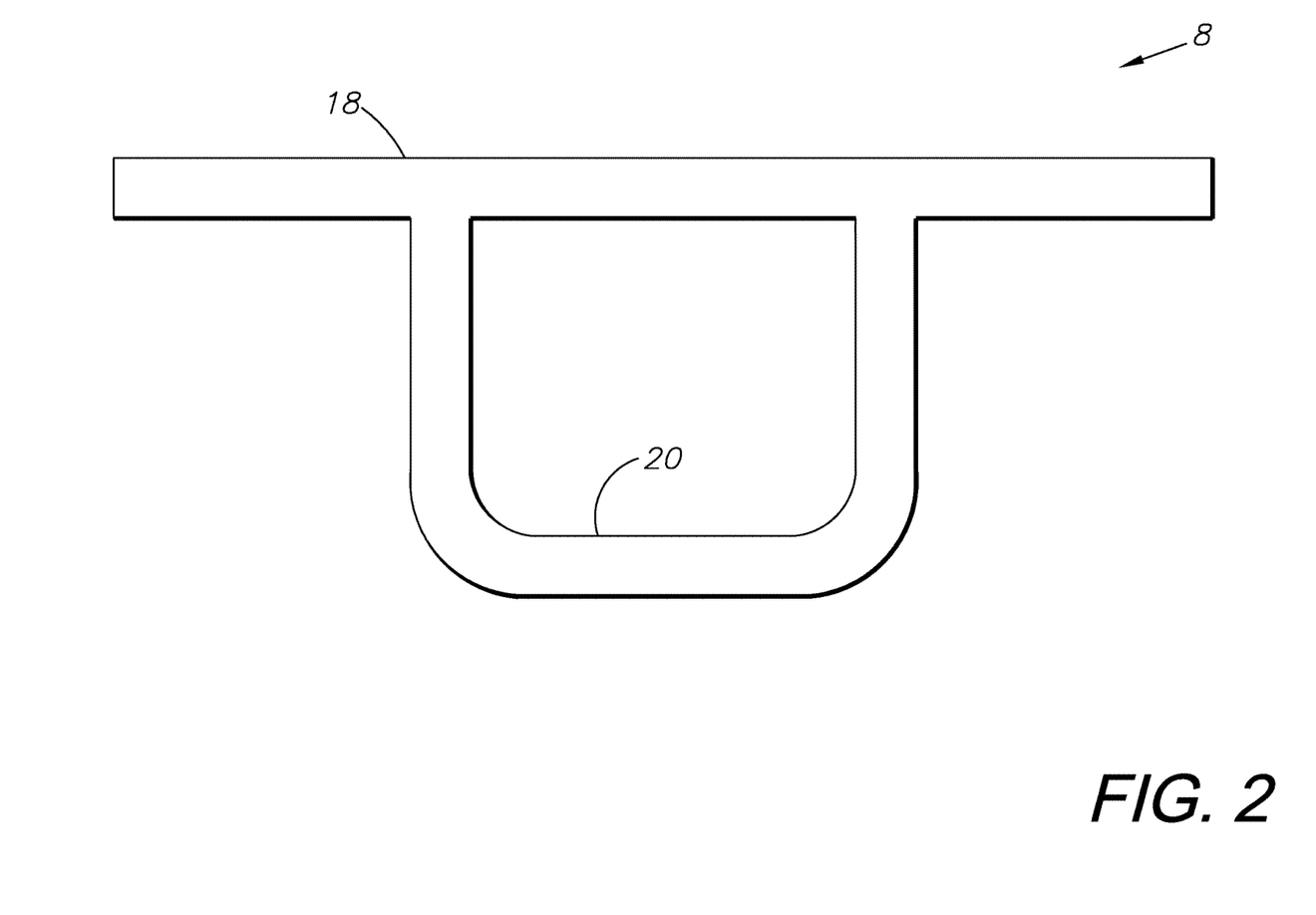
FIG. 2 is a front elevational view of a component thereof.
Figure 3:
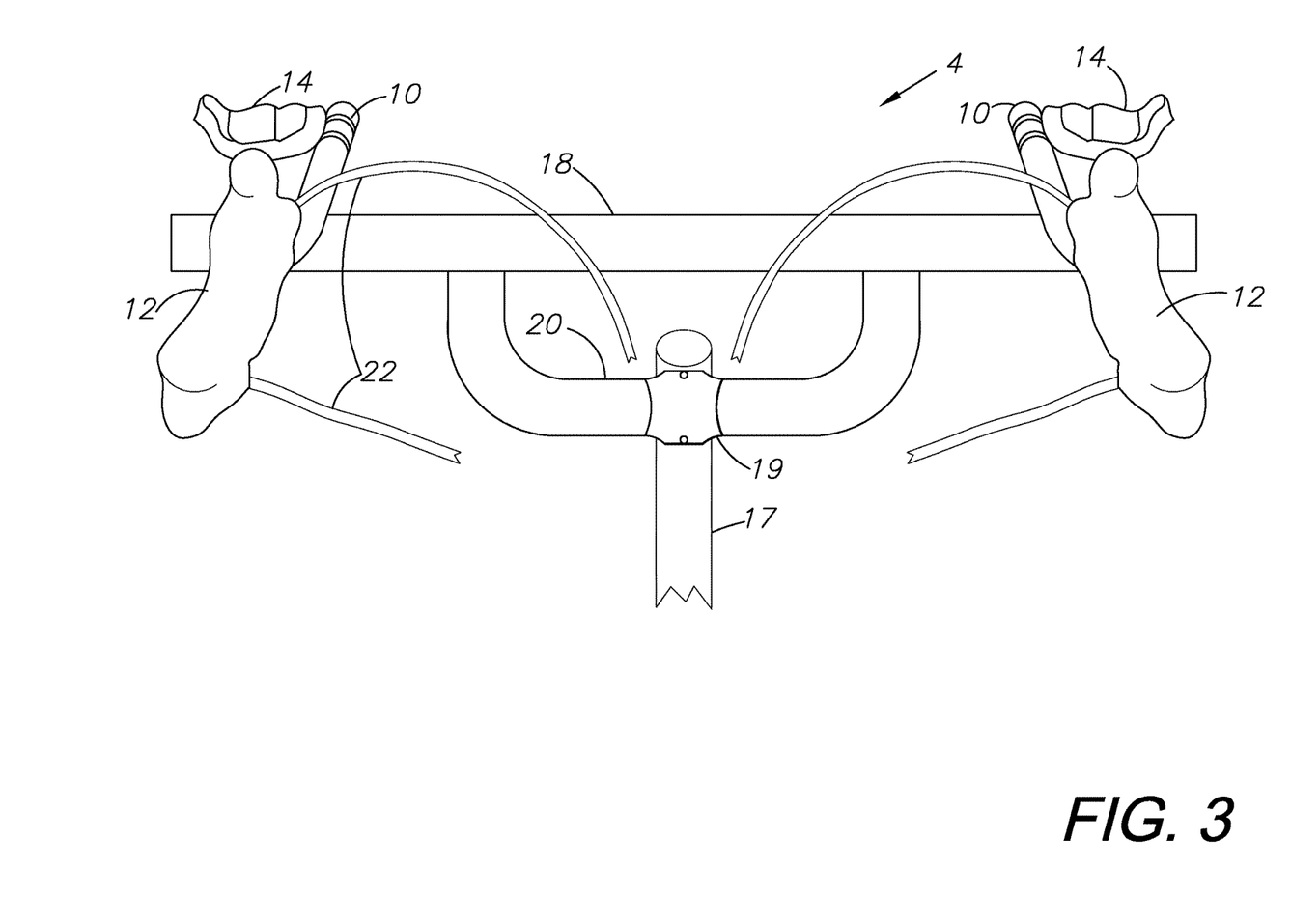
FIG. 3 is a front elevational view of the embodiment of FIG. 1.
Figure 4:
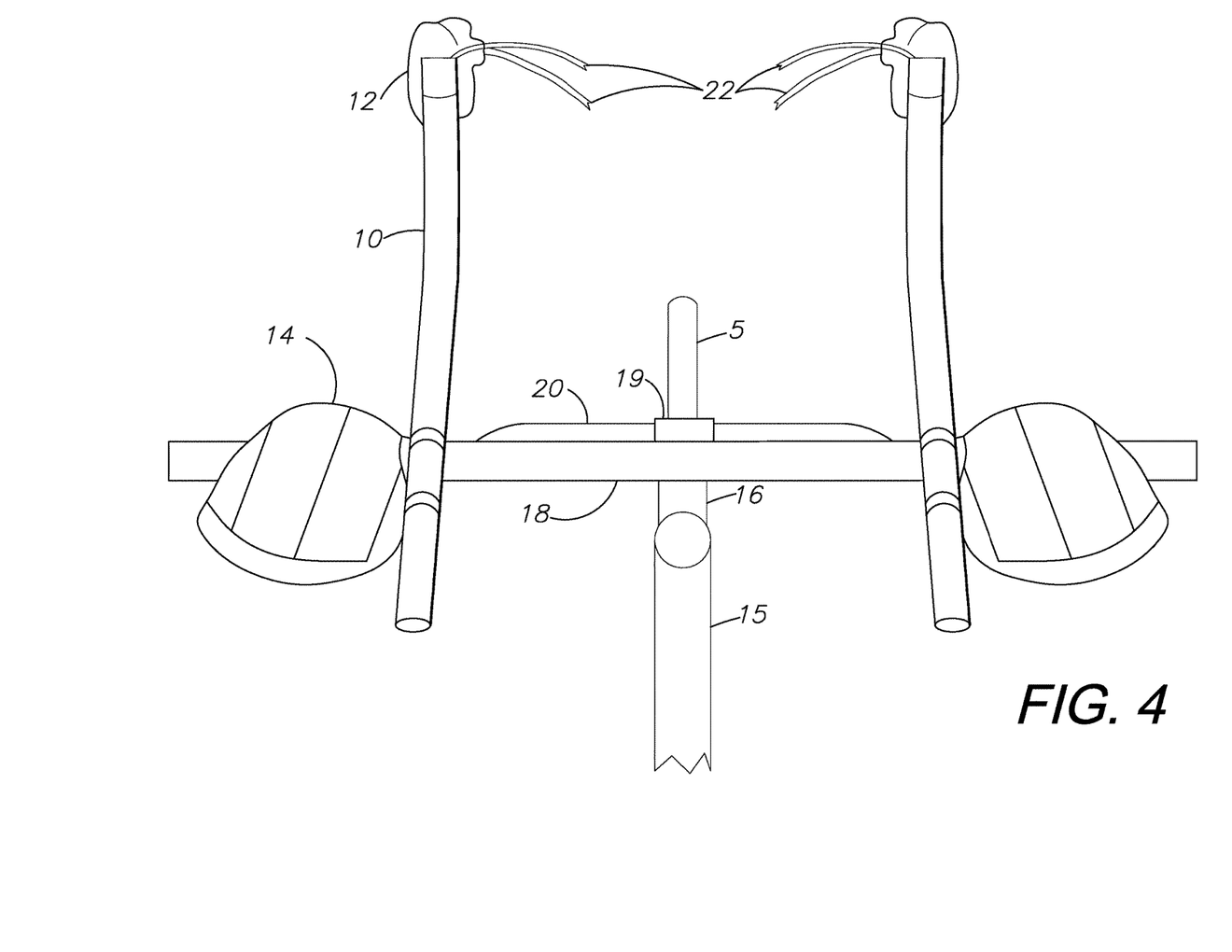
FIG. 4 is a rear elevational view thereof.
Figure 5:
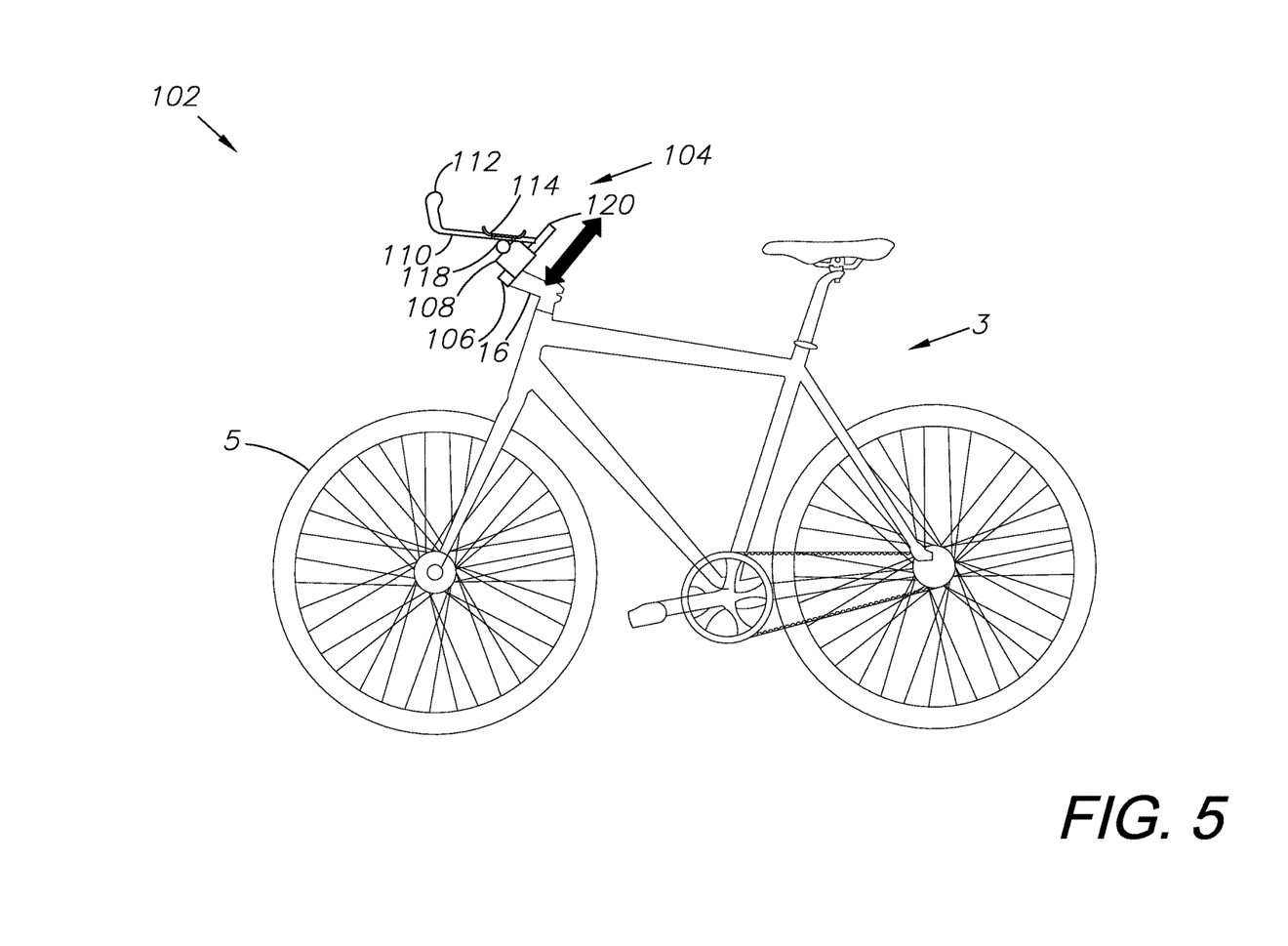
FIG. 5 is a side elevational view of a second embodiment of present invention shown in a typical environment of a bicycle.

FIGS. 1-4 show a first embodiment of the present invention. A U-shaped tube 20 connected to a horizontal crossbar 18 forms the basic frame 8 of the handlebar assembly 4. The tube 20 connects to the stem 16 of the bicycle 3 above the steerer tube 17 and is secured by a stem clamp plate 19, just out in front of the top tube 15 as shown in FIG. 4. A pair of steering bars 10 are mounted to the horizontal crossbar 18 and spaced apart to provide typical steering control of the handlebar assembly, unlike existing aerobar assemblies which are placed close together to provide an aerodynamic position with a sacrifice in steering control and comfort.

The assembly is raised up perpendicular to the bicycle tire 5, such that the rider can grip the steering bars 10 while mostly seated up in a position resembling a typical casual bicycle riding position. Approximately a 45 degree angle would be a preferable angle between the tube 20 and the stem 16. A pair of forearm supports 14 are placed outside of the steering bars, mounted preferably to the steering bars 10 but may be optionally mounted directly onto the horizontal crossbar. The rider will place their forearms onto the support pads 14 and will then grip the steering bars 10 about the handles 12 which are projected out in front of the crossbar 18. The handles 12 include connections and controls for the bicycle 3 brakes via the brake lines 22. All of the gear switching controls and brake controls are located at the end of the steering bars, and the steering bars are shaped to accommodate the rider's hands. In this position, any impact that would normally be sent up the bicycle's frame to the rider's hands and wrists is instead transferred to the rider's forearms through the padded supports, thereby nullifying what would otherwise be a jarring impact that could injure or aggravate the rider's hands and wrists.

This assembly provides a user with familiar steering control over a bicycle that is otherwise lost using typical aerobar assemblies, while providing structural and comfortable support against the rider's forearms, preventing injury or discomfort to the rider's hands and wrists.

III. Second Embodiment Bicycle Handlebar System 102

FIGS. 5-10 show a second embodiment handlebar assembly 104 for a bicycle 3. Here, the stem 16 extension attaches to an adjustable mount base 106 which acts as a stop to a pair of slides 108 which slide along a pair of tubes 120 extending upwards toward the rider. These tubes 120 function as a ramp to allow the assembly to slide from a raised position to a lowered position. A crossbar 118 similar to the crossbar of the embodiment above is connected to these tubes via the slides 108 and can be slid up and down as the rider desires. The lower setting simulates the standard drop bars that riders employ on their handlebars when they wish to reposition into a lowered, more aerodynamic position. Unlike aerobars, this embodiment would maintain typical control over the handlebar while allowing the user to take advantage of a more aerodynamic position. The bars 110 include forearm supports 114 and end grips 112 which include the controls for brakes and gearing, and are attached to brake and control lines 122 and switches 124 for such control.

Figure 6:
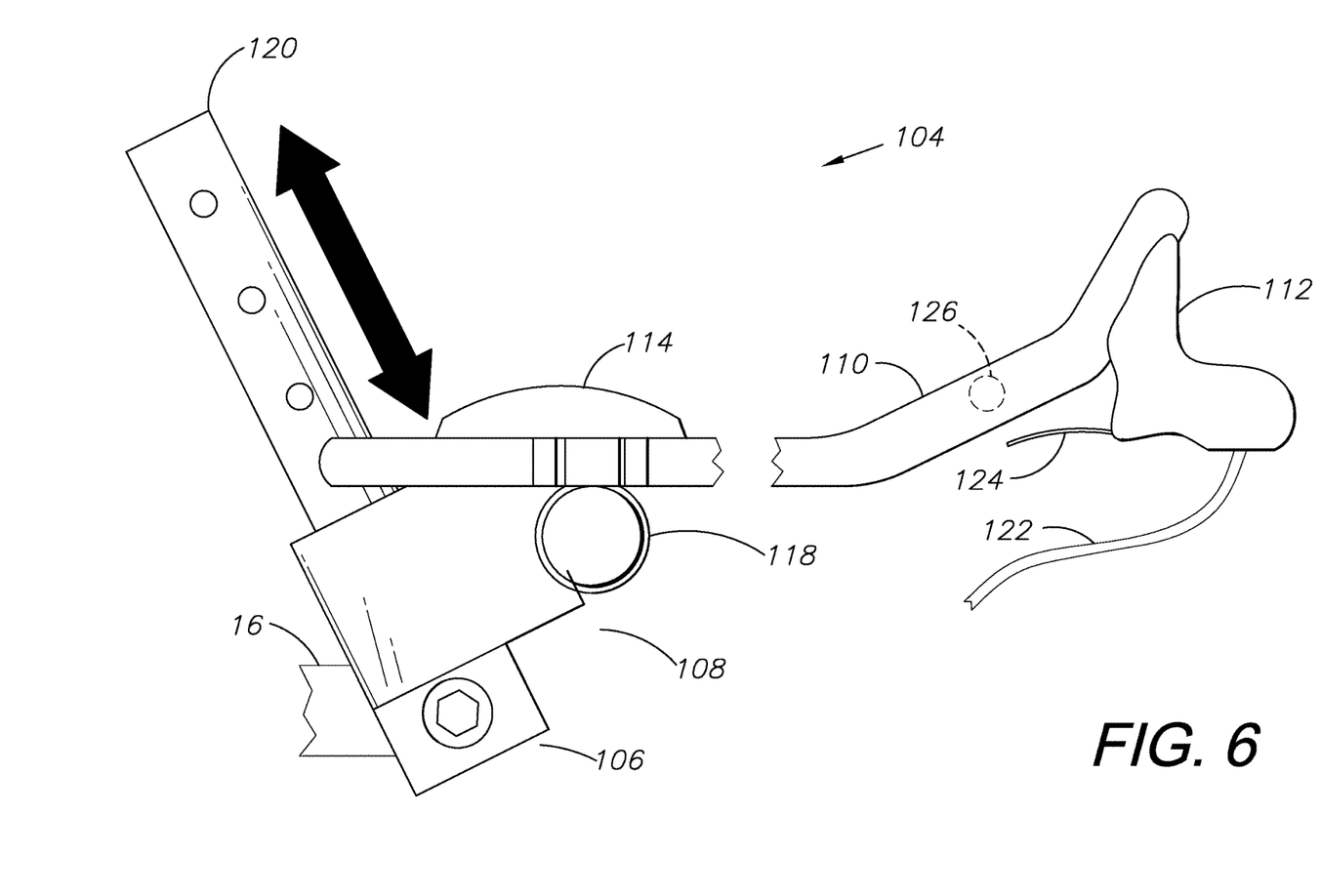
FIG. 6 is a side elevational view thereof.
Figure 6A:
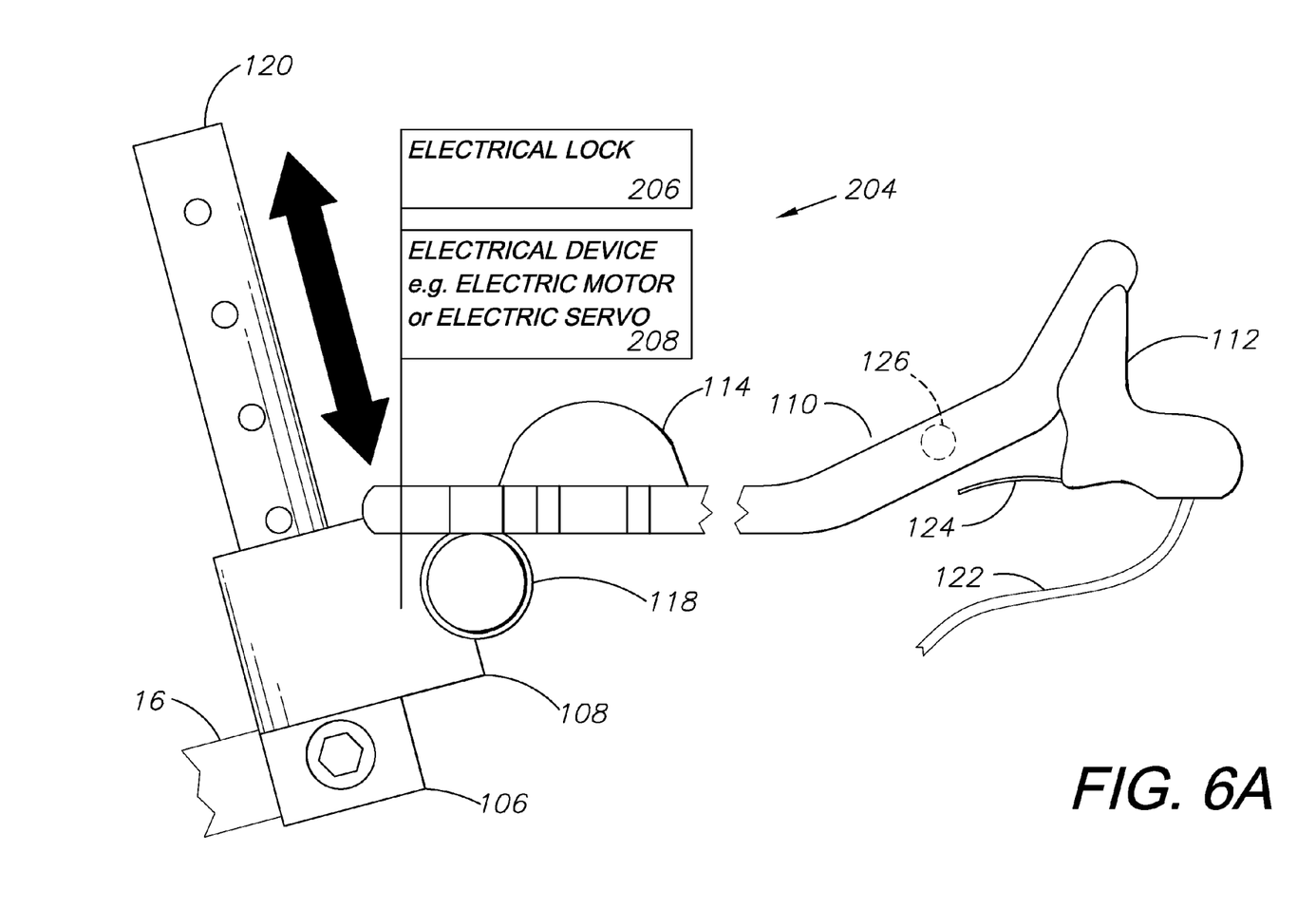
FIG. 6A is a side elevational view of an alternative embodiment thereof.

In one embodiment 204 as shown in FIG. 6A, the slides 108 would be triggered by an electric lock 206 which would prevent the bar from being raised or lowered except for when it is released by the rider using the switch 126 mechanism to unlock the slides 108 from the tubes 120, thereby preventing an accidental lowering or raising of the bar. The user would press a switch 126 which would release the lock, thereby allowing the structure to be lowered to a desired level, after which it would be locked into place again until the user decided to raise or lower the bar. Preferably the switch 126 is placed on the inside of the bars 110 to prevent accidental pressing of the switch. A release mechanism physically interlocks with the tubes 120 and can be released using an electric motor, gear, or any other mechanical or electrical device 208. Approximately a 45 degree angle would be a preferable angle between the tubes 120 and the stem 16.

Figure 6B:
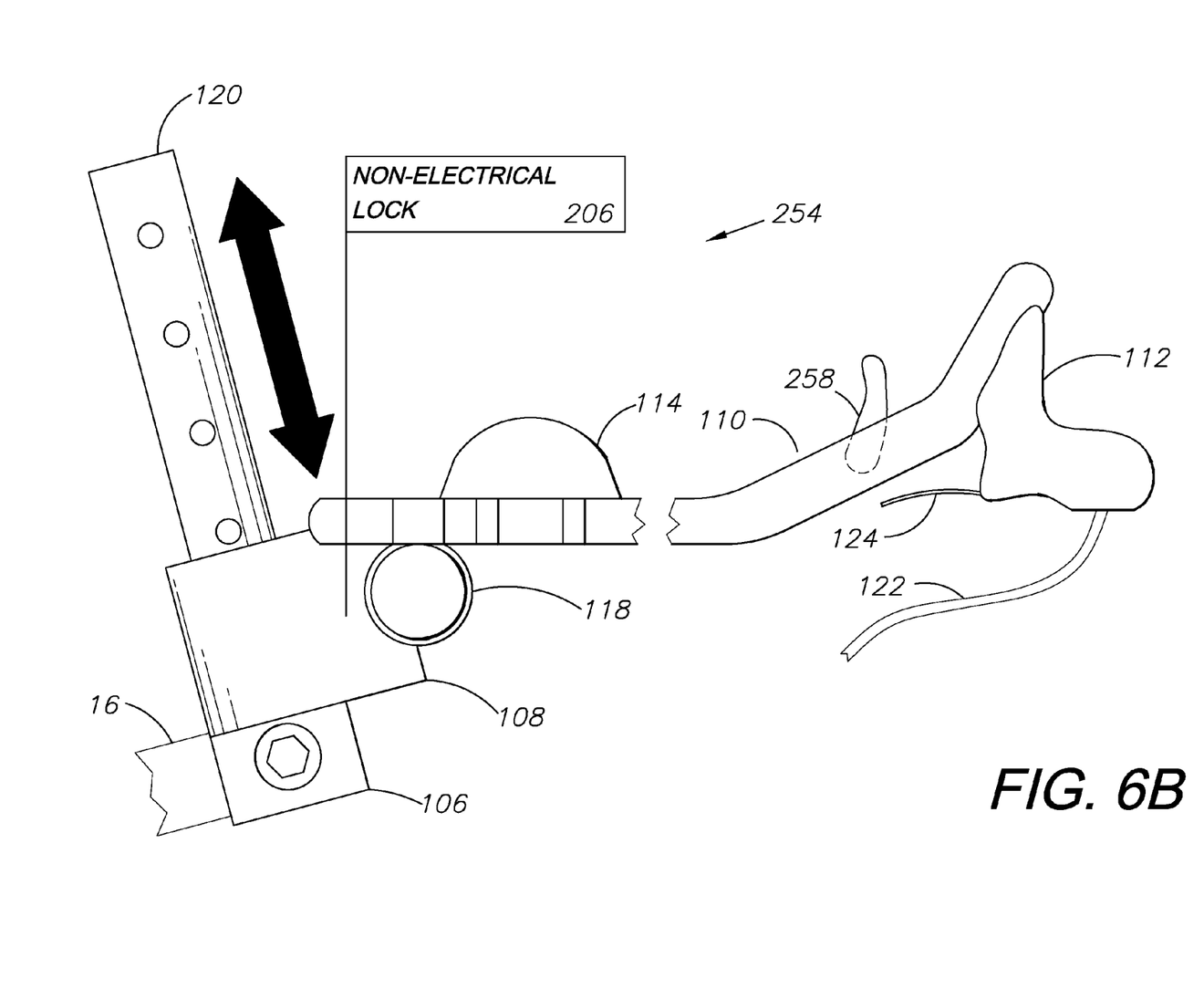
FIG. 6B is a side elevational view of yet another alternative embodiment thereof.
Figure 7:
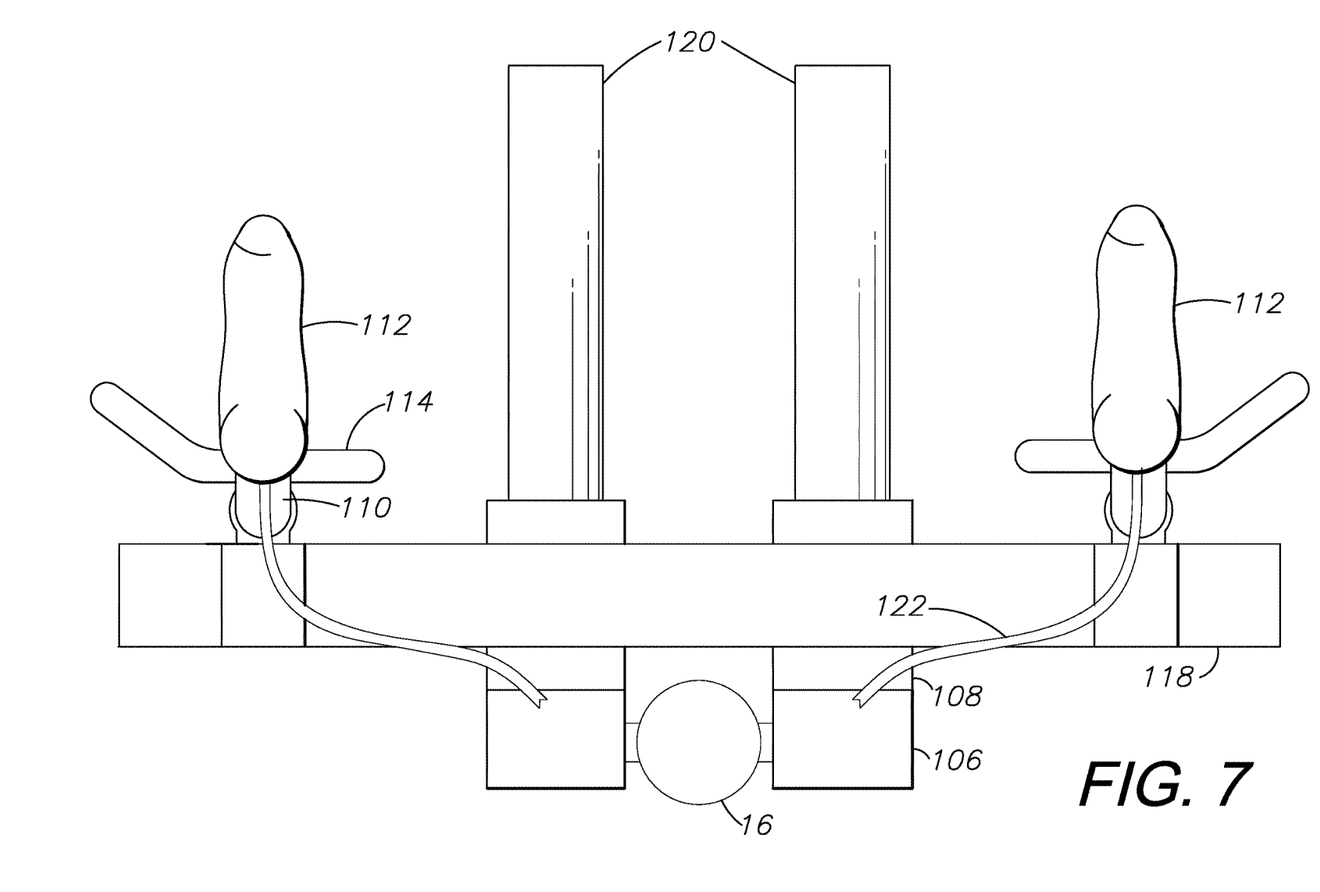
FIG. 7 is a front elevational view thereof.
Figure 8:
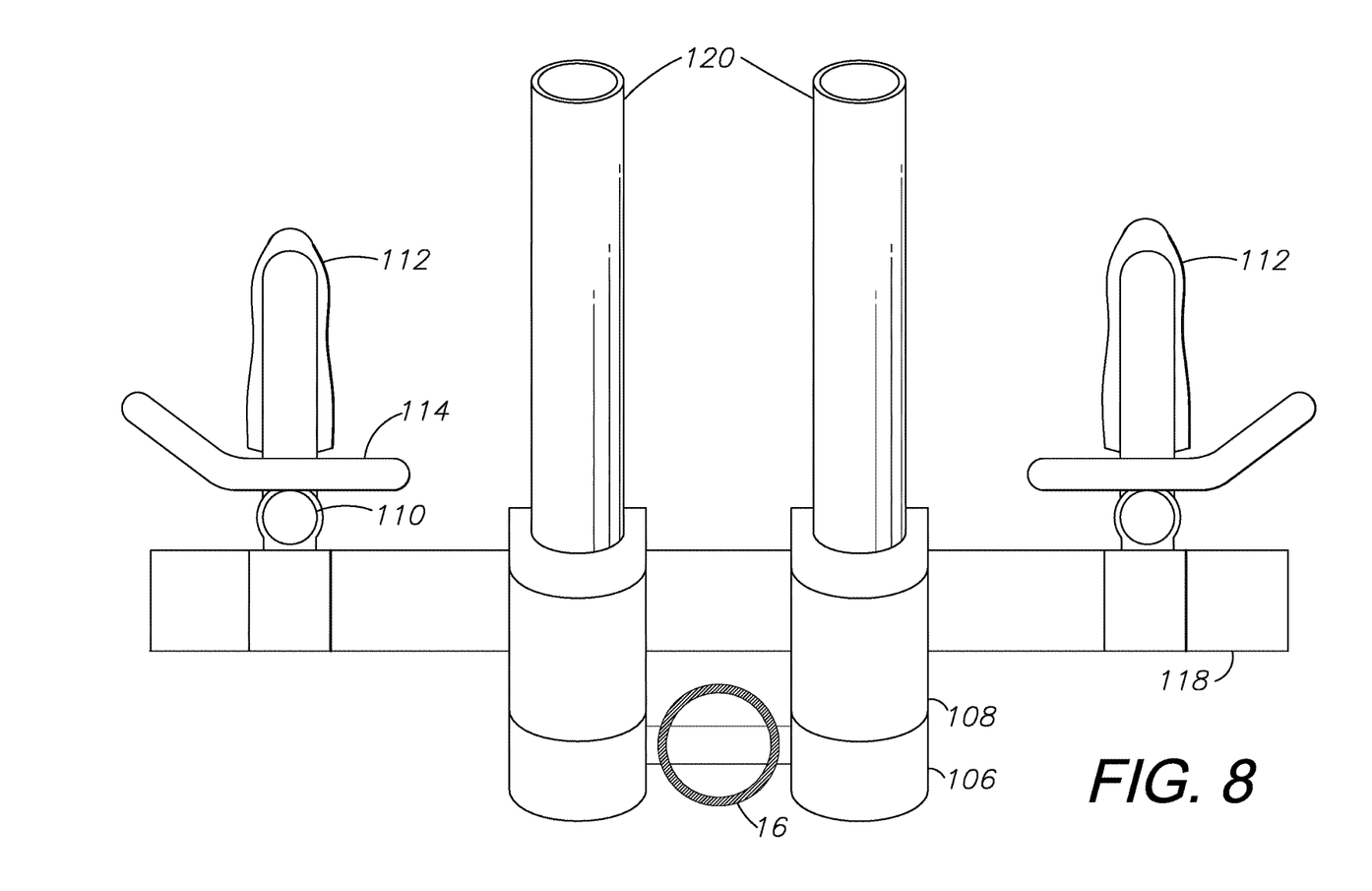
FIG. 8 is a rear elevational view thereof shown in a lowered position.
Figure 9:
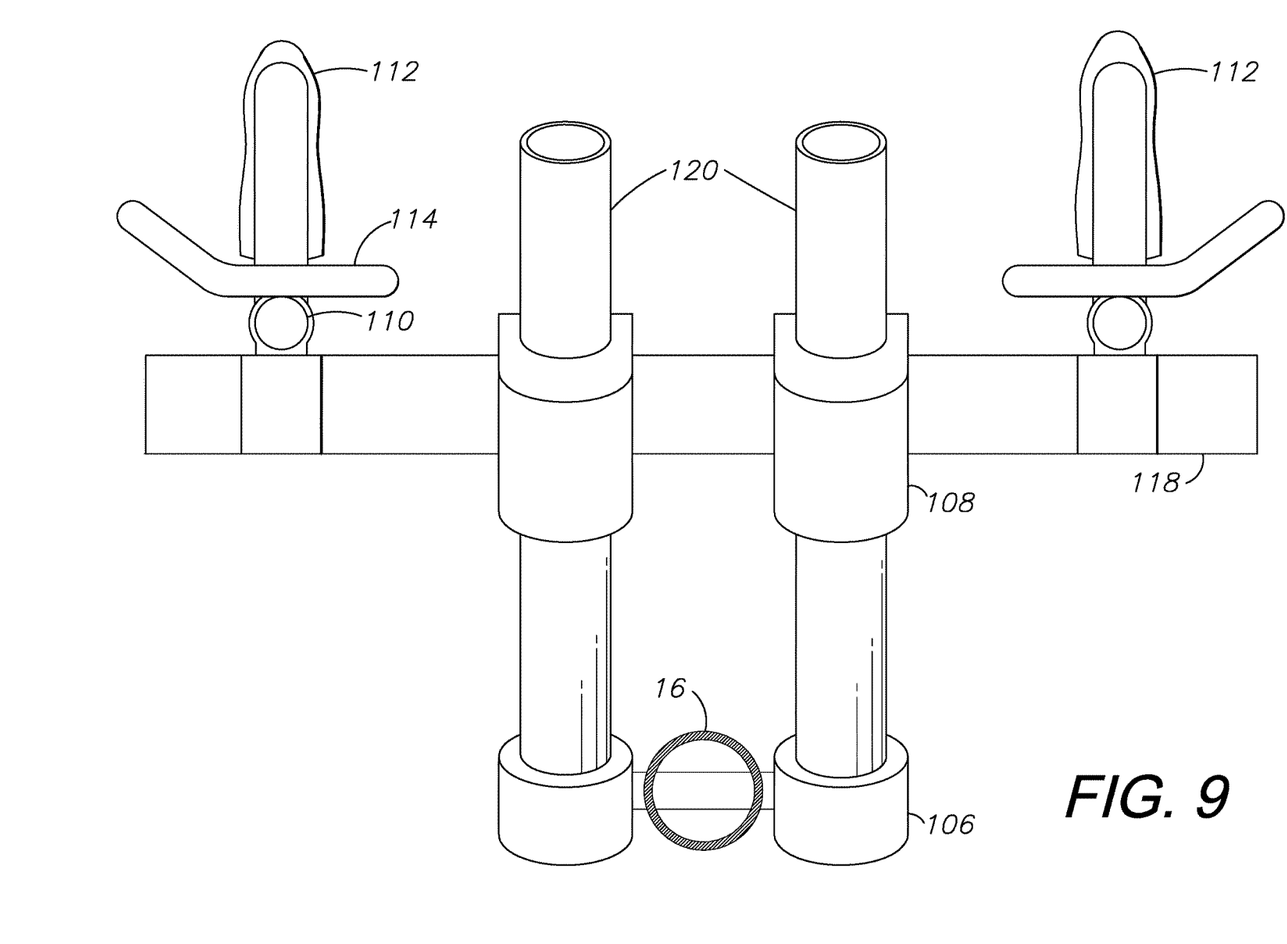
FIG. 9 is a rear elevational view thereof shown in a raised position.

In the case of an electrically operated device 208, a servo or similar unit, or motor, could operate a release and locking mechanism, allowing the user to move the bars either up and backward toward the user or lower and forward away from the user, and then locking the bars in the new position. If instead a cable-actuated non-electric release 256 as shown in FIG. 6B and embodiment 254 is used, a lever 258 or other mechanical device would be used to a similar effect. As an alternative, a motor could be used with or without gearing or a toothed or screw drive to directly move the assembly up or down along the path guided by the tubes and the slides.

Other means of raising and lowering the assembly could be employed, such as a lever or a manual lock. Still other options include the cross bar being attached to two parallel tubes, which then slide through a fixed cross piece that is attached to the stem. Another alternative system would be more like a single ramp device. Another would be a double-hinged folding arm. Yet another possible way to construct this would be to use one or more telescoping supports which allow the tubes to slide into lower sections when the bar is lowered and slide out of lower sections (e.g. telescope) when raised. Suffice it to say that there are a number of possible mechanisms for accomplishing the movement of the cross bar down and forward or up and back while riding.

Similarly, the release and locking element could be a screw mechanism, possibly even powered, that would itself move the cross bar, rather than the cross bar being moved by the rider's pushing or pulling. In a non-powered device, the user would raise and lower the crossbar using the locking element to move the bar between one of multiple positions along the tubes 120.

Like in the previous embodiment, the steering bars 110 are affixed to the horizontal crossbar 118 and project away from the rider. All controls are located at the end of these steering bars in the grips 112. A forearm rest 114 is attached to the steering bar to accept the user's forearms, thereby removing impact from the user's wrists and hands.

The drawings show the pair of slides 108 traveling along a pair of tubes 120. Alternatively, a single tube could be used, or another comparable structure entirely could be used as long as the handlebar assembly is allowed to move up and toward the user in a raised position and down and away from the user when in an aerodynamic position. This action as discussed above could be activated by a switch or a lever or some comparable device. Similarly, the steering bars 110 may be selectively moved outwards or inwards as the user desires. This action may also be activated using a switch or lever allowing for quick and safe displacement of the bars. Also, unlike as shown in the drawing, the tubes 120 could be physically connected to the slides 108 such that he tubes actually slide within the blocks 106 and do not extend up toward the user while the assembly is in a lowered, aerodynamic position.

The slides and tubes, as discussed above, could come in a variety of shapes and include a variety of locking, stopping, and release features including a spring-loaded button, a manually-inserted peg, button and hole release/braking, friction braking, geared braking, gas-cushioned braking, or toothed braking with a toothed track along the tubes 120 and a toothed insert within the slide 108.

Figure 10:
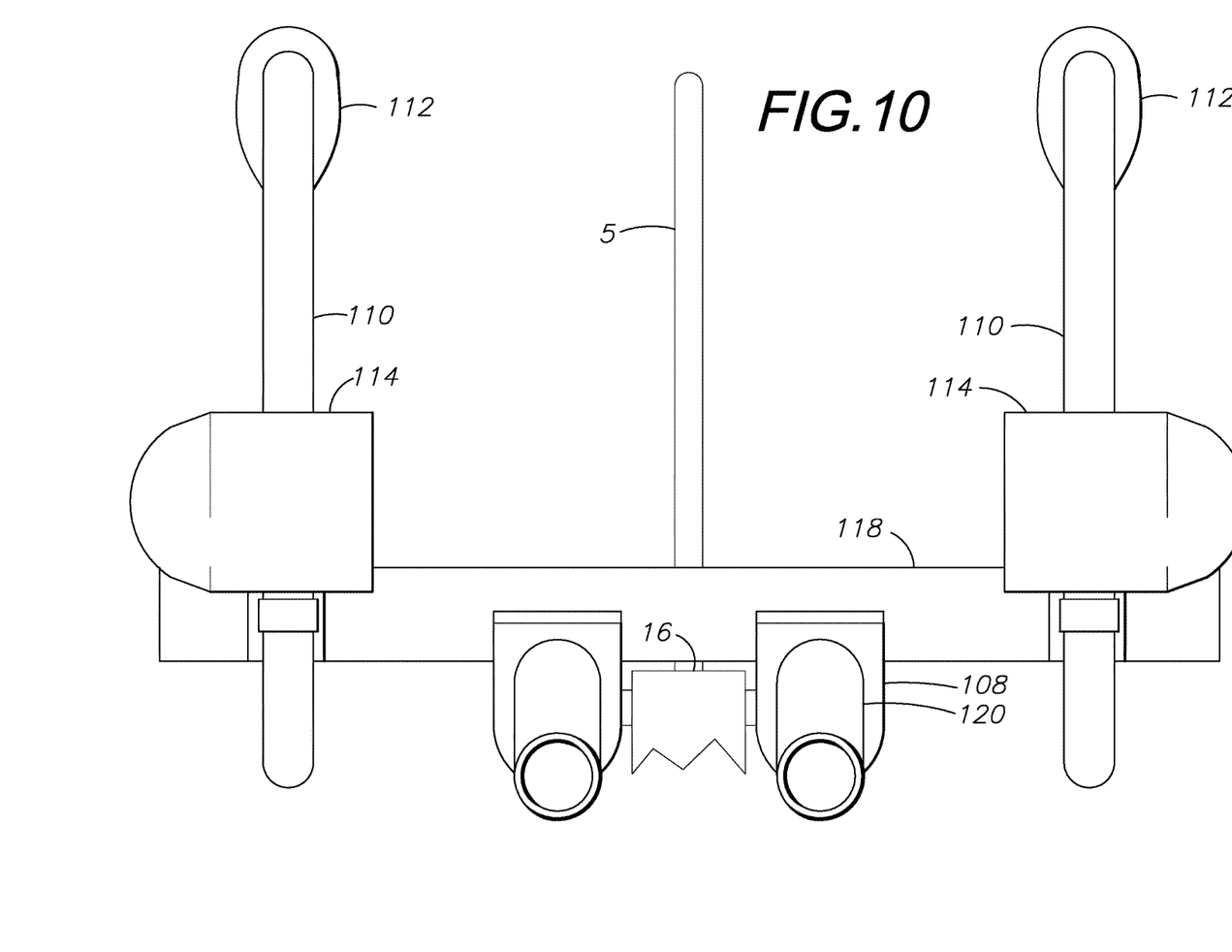
FIG. 10 is a top plan view thereof.

Other hand positions could also be supported using bar ends (e.g. as shown in FIG. 10) for climbing positions and other personal riding preference.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A bicycle handlebar assembly comprising:
    a horizontal crossbar engaging a bicycle stem, the horizontal crossbar including a left end and a right end;
    a steering bar assembly including at least one steering bar having a respective proximal end affixed to said horizontal crossbar and a distal end extending away from said horizontal crossbar, said at least one steering bar located along said horizontal crossbar;
    a forearm support placed in proximity with said horizontal crossbar and said steering bars;
    said at least one steering bar further including an end grip located at said distal end, said end grip including brake and gearing controls for controlling said bicycle;
    the bicycle handlebar assembly being configured to be transformed during operation of the bicycle from a first, raised position to a second, lowered position;
    a slide connected to said horizontal crossbar, said slide slidingly engaged with a ramp engaged with said bicycle stem; and
    a switch configured to release said slide about said ramp, such that said bicycle handlebar assembly can slide back and up to said first, raised position and down and forward toward said second, lowered position.

2. The bicycle handlebar assembly of claim 1, wherein said switch is configured to control a locking mechanism configured to release and re-lock-said slide along said ramp, said locking mechanism comprising an electrically operated device selected from the list comprising: a servo; and a motor.

3. The bicycle handlebar assembly of claim 1, wherein said switch is configured to control an electric motor which drives said slide.

4. The bicycle handlebar assembly of claim 1, wherein said switch comprises a lever configured to control a non-electrical lock which engages said slide.

5. The bicycle handlebar assembly of claim 1, further comprising:
    said steering bar assembly comprising a pair of steering bars configured to be moved between a first position and a second position horizontally along said horizontal crossbar; and
    a switch configured to release said pair of steering bars from said horizontal crossbar such that they can be moved from said first position to said second position.

6. A bicycle handlebar assembly comprising:
    a bicycle stem extension affixed to a block;
    a ramp affixed to said block and slidingly engaging a slide which is affixed to a horizontal crossbar including a left end and a right end;
    a pair of steering bars each having a respective proximal end affixed to said horizontal crossbar and a distal end extending away from said horizontal crossbar, a first of said pair of steering bars located in proximity with said left end of said horizontal crossbar and a second of said pair of steering bars located in proximity with said right end of said horizontal crossbar;
    a forearm support placed in proximity with said horizontal crossbar and said steering bars;
    each of said pair of steering bars further including an end grip located at said distal end, said end grip including brake and gearing controls for controlling said bicycle;
    wherein said block prevents said slide from sliding past said block; and
    a switch configured to release said slide from said ramp, such that said bicycle handlebar assembly can slide back and up to said first, raised position and down and forward toward said second, lowered position.

7. The bicycle handlebar assembly of claim 6, wherein said switch is located on one of said pair of steering bars.

8. The bicycle handlebar assembly of claim 6, wherein said ramp comprises a pair of tubes, each located on a respective side of said bicycle stem.

9. The bicycle handlebar assembly of claim 8, wherein said slide comprises a pair of slides, each slides placed about a respective one of said pair of tubes.

10. The bicycle handlebar assembly of claim 6, wherein said switch is configured to control an electric motor which drives said slide.

11. The bicycle handlebar assembly of claim 10, wherein said switch is configured to control a locking mechanism configured to operate a release and re-locking mechanism for said slide along said ramp, said locking mechanism comprising an electrically operated device selected from the list comprising: a servo; and a motor.

12. The bicycle handlebar assembly of claim 6, wherein said switch comprises a lever configured to control a non-electrical lock which engages said slide.

13. The bicycle handlebar assembly of claim 6, further comprising:
    said pair of steering bars configured to be moved between a first position and a second position horizontally along said horizontal crossbar; and
    a switch configured to release said pair of steering bars from said horizontal crossbar such that they can be moved from said first position to said second position.

* * * * *